United States Patent [19]

Adell

[11] 4,338,148

[45] Jul. 6, 1982

[54] METHOD OF MANUFACTURING A DOOR EDGE GUARD

[75] Inventor: Robert Adell, Novi, Mich.

[73] Assignee: U.S. Product Development Co., Novi, Mich.

[21] Appl. No.: 194,747

[22] Filed: Oct. 7, 1980

[51] Int. Cl.³ .............................................. B32B 3/04
[52] U.S. Cl. .................................... 156/222; 49/462; 52/823; 156/216
[58] Field of Search ............... 156/222, 200, 202, 212, 156/216, 221, 224; 52/823; 53/486; 428/31, 83, 124, 192, 174; 293/123, 126, 128; 49/462

[56] References Cited

U.S. PATENT DOCUMENTS

| | | | |
|---|---|---|---|
| 3,340,714 | 9/1967 | Pohl et al. | 156/224 |
| 3,547,515 | 12/1970 | Shanok et al. | 49/462 |
| 3,811,989 | 5/1974 | Hearn | 428/31 |
| 4,220,681 | 9/1980 | Narito | 293/126 |
| 4,271,633 | 6/1981 | Odell | 52/823 |

Primary Examiner—James J. Bell
Attorney, Agent, or Firm—Olsen and Stephenson

[57] ABSTRACT

A method of manufacturing a door edge guard of the type particularly suitable for protection of the edge of an automobile door from paint chips. The method is an improvement over the technique of using separate manufacturing procedures to produce a plastic U-shaped inner channel (liner) configured to mate with a U-shaped metal outer channel. The method of the invention comprises the steps of roll-forming a metal element of an edge guard into a U-shaped channel element and bonding a plastic material to at least a portion of the inner surface area of the U-shaped metal element prior to completion of the roll-forming operation. The bonding may take place before roll-forming is begun.

11 Claims, 11 Drawing Figures

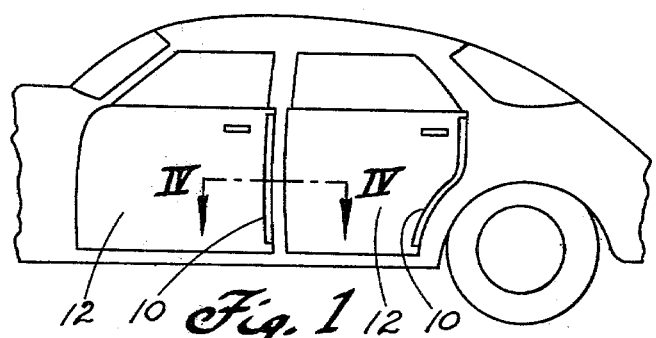
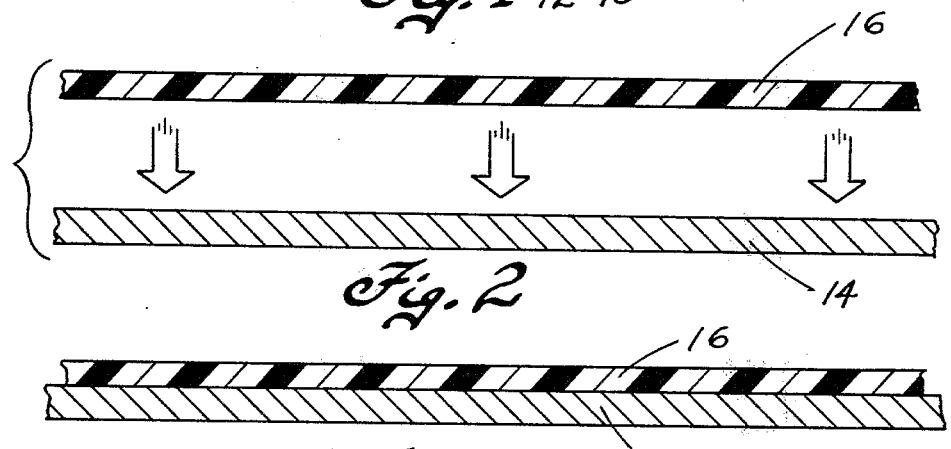
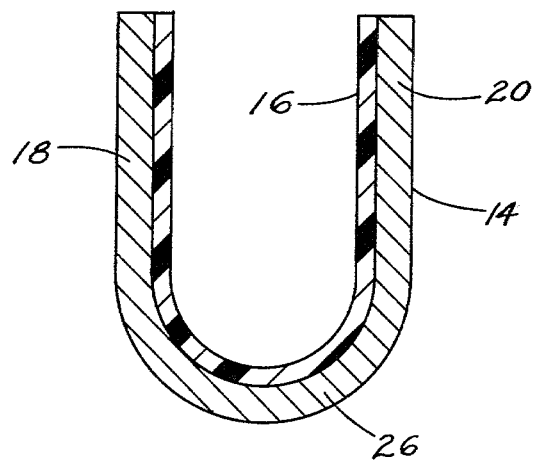

METHOD OF MANUFACTURING A DOOR EDGE GUARD

BACKGROUND OF THE INVENTION

This invention relates to a method of manufacturing door edge guards for use in the protection of sheet metal edges, such as those used in automotive doors, from damage from impacts with and by other objects.

Door edge guards typically are applied to the vertical sheet metal edges of automotive doors in a self-adhering manner. The edge guards are formed in a U-shape for this purpose and are made from a metal of decorative character. Steel, either stainless or plated, is the metal usually chosen because of its strength, formability, spring characteristics and ability to accommodate doors of varying and various thicknesses. Separate fasteners or adhesive for the door edge guards generally is considered to be unacceptable by automobile manufacturers, after-market dealers and end-users of these devices. Also, edge guards that would add to the likelihood of door edge corrosion are unsatisfactory. For this reason, there is a demand for edge guards that have an inner liner that prevents metal-to-metal contact between the edge guard and the somewhat dissimilar metal of the door itself. Usually, the inner liner is made from a vinyl or other suitable plastic material.

When plastic liners are used in door edge guards, it is customary to fabricate the inner plastic liner as a plastic extrusion that has a U-shape and that is positioned in the slightly larger U-shaped metal outer element prior to assembly of the plastic and metal elements on the door edge. The plastic element is in direct contact with the door while the resiliency of the steel (or other outer element material) effectively fastens the assembly on the door edge. The plastic has the advantage of preventing some of the scratching and chipping of the door's paint which, in its absence, might occur during sliding of the U-shaped edge guard assembly over the door edge.

SUMMARY OF THE INVENTION

The method of the invention forms a door edge guard that has a metal outer U-shaped channel element and an inner plastic U-shaped channel element. The outer metal channel is roll-formed and the inner plastic channel is bonded to at least a portion of the inner surface of the outer metal channel element prior to completion of the roll-forming operation. After the inner plastic channel has been at least partially bonded to the outer metal channel, the ends of the legs of the outer channel can be bent inwardly upon themselves to round the ends of the legs and form an edge guard of improved appearance. The plastic inner channel may be bonded to the end of the inner surface of the outer channel either before or after the bending of the ends. If it is bonded to the outer channel before the bending operation, then a double layer of dielectric material is formed at the ends of the legs of the edge guard. The plastic (dielectric) material may be made to extend back around the inner surfaces of the ends of the edge guard legs so that a layer of dielectric material will be located between the edge guard and the door upon installation.

The invention may be better understood by reference to the detailed description which follows and to the drawings.

BRIEF DESCRIPTION OF THE DRAWINGS

FIG. 1 is a partial elevational view of an automobile equipped with door edge guards;

FIG. 2 is a cross-sectional view of metal and plastic strip elements prior to their assembly in one another;

FIG. 3 is a sectional view of the metal and plastic strips in contact with one another;

FIG. 5 is a sectional view of the door edge guard of FIG. 4 during one stage in the process for its manufacture;

DETAILED DESCRIPTION

Figure 4:
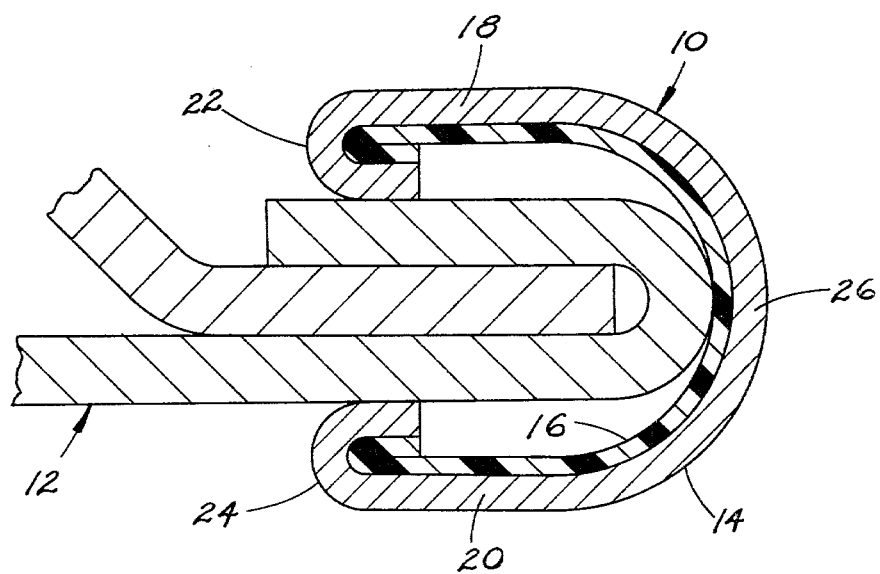
FIG. 4 is a sectional view, taken along the line IV-IV in FIG. 1, of a door edge guard assembled on the edge of the door of an automobile.

With reference to the drawings, there is shown in FIG. 1 an automobile having guards 10 received on the edges of the respective doors 12 of the vehicle. The door edge guards 10 are shown in FIG. 4 as they might appear assembled on the doors 12 in self-retaining manner. Each door edge guard has a U-shaped configuration formed from a metal channel element 14 that has an inner element or liner 16 formed in a similar U-shape. The liner 16 is made of a plastic (dielectric) material for the purpose of electrically insulating the door edge guard from the sheet metal of the door, a somewhat dissimilar metal in most applications and, therefore, subject to electrolytic corrosion. The plastic liner of the door edge guard also helps protect the door from damage to its protective coatings during installation of the door edge guard. As may be seen in FIG. 4, the door edge guard has legs 18 and 20 with ends 22 and 24 that are formed by folding the ends of the outer metal channel 14 inwardly upon themselves. These bends are desirable from the standpoint of the improved appearance that results from their use. Also, the bends 22 and 24 aid installation of the door edge guard on a door.

Figures 7, 8:
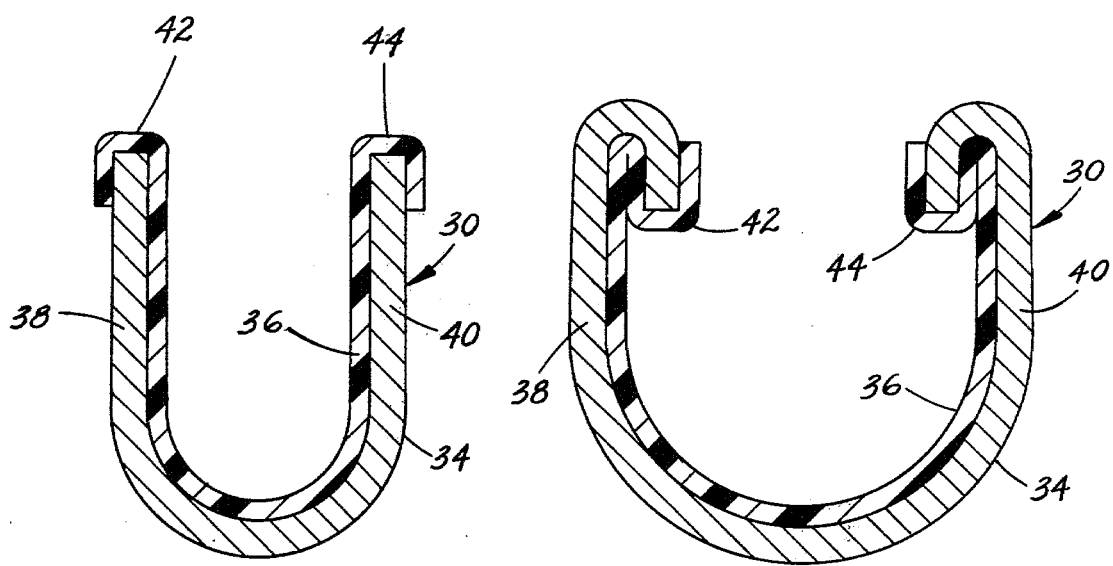
FIG. 7 is a sectional view of an alternative construction of a door edge guard at the stage mentioned above with respect to FIG. 5.
FIG. 8 is a sectional view of the door edge guard of FIG. 7 in a second stage in its manufacture.
Figure 11:
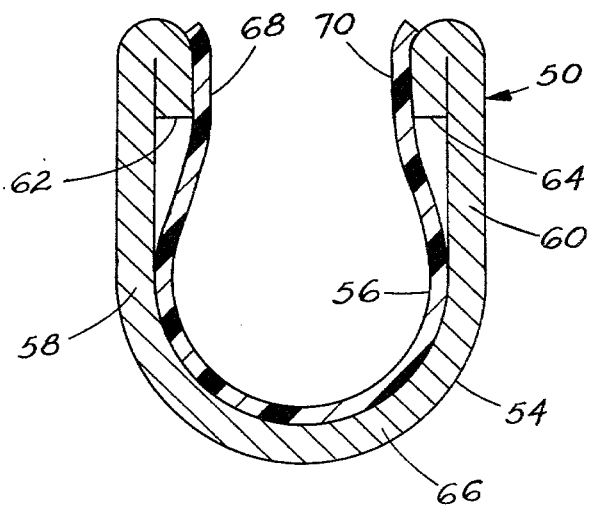
FIG. 11 is a sectional view of the door edge guard of FIGS. 9 and 10 as it would appear just prior to installation on the edge of an automobile or other door requiring protection.

If the door edge guard has bends 22 and 24, direct metal-to-metal contact between the door sheet metal and the metal of the outer channel 14 results. This is somewhat undesirable in that there is some increase in the possibility of electrolytic corrosion, but this effect is not as serious at the end location of the door edge guard than it is at the base 26 of the edge guard where the retention of moisture is more likely. If desired, the plastic liner can be made to extend, as shown in FIGS. 8 and 11, to the points at which the folded ends of the legs of the edge guard contact the door 12.

With particular reference now to FIG. 2, there is shown the metal element 14 and the plastic element 16 of what is to become a door edge guard. The plastic element 16 can have the same width as the metal element 14 or can be of different width. If the configuration of FIG. 8 is being produced, it may be desirable initially to have the plastic element 16 of greater width than the metal element, but this is not essential because the plastic material applied to the ends of the legs of the edge guards in the various FIGS. 6–11 can be separately applied as a plastic film or plastisol material.

The plastic preferably is of the vinyl type and may be applied to the metal as a film (plastic sheet material) or as a plastisol that can be sprayed or otherwise applied in liquid form to the metal surface to be coated. Plastic films can be applied to the metal element with suitable adhesives or by laminating the plastic film to the metal with heat or other means. The method of plastic material application is dependent to some extent on the materials selected and on the final edge-guard configuration desired.

In FIG. 3, the metal element 14 and the plastic element 16 are shown in contact with one another. In FIG. 5, these two elements are shown after roll-forming into the aforementioned U-shape. The bonding of the two elements may take place over all or only part of the area of contact of these elements and may be accomplished at any time during the roll-forming operation. Also, it is possible to spray plastisol into the U-shaped metal element 14 while it is in the process of being formed into such shape and prior to completion of this forming operation. Sizing of the plastic-lined edge guard can be accomplished with an appropriately sized roller in accordance with practices typically employed in roll-forming operations.

Figure 6:
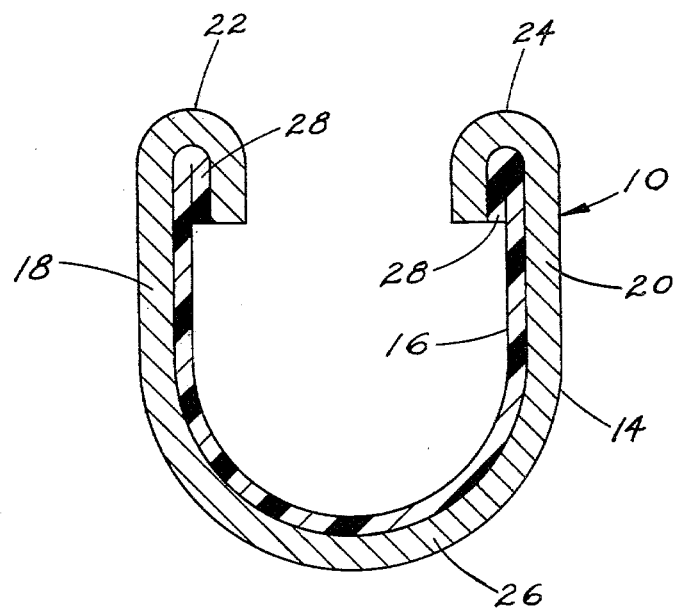
FIG. 6 is a sectional view of the door edge guard of FIG. 5 in a second stage in its manufacture.

The sized edge guard can be attached to a door edge in the form shown in FIG. 5, but folding the ends inwardly to form the structure shown in FIG. 6 is more desirable due to the better appearance that results. The application of the bonded liner to the metal before the ends 22 and 24 are bent inwardly provides a double layer of dielectric material in the spaces 28 at the folded ends 22 and 24.

FIGS. 7 and 8 are similar to FIGS. 5 and 6, but differ in that the illustrated edge guard 30 has plastic material on the ends of the legs of the metal element 34, as shown at 42 and 44. The plastic at the ends of the legs can be a part of the plastic element 36 or can be separate plastic elements applied, before, during or after roll-forming, as a plastic film or a plastisol spray. The plastic is applied so that it covers both the inner and a part of the outer sides of the ends of the legs 38 and 40 of the U-shaped metal element 34. Following this operation, the ends 42 and 44 are folded over upon themselves, as shown in FIG. 8, thereby providing a layer of dielectric material between the edge guard and the sheet metal of a door edge received between the edges 42 and 44. The edge guard 30 has the appearance and installation advantages of the edge guard 10 of FIG. 6, but in addition has the dielectric material completely separating the edge guard from the door sheet metal.

Figure 9:
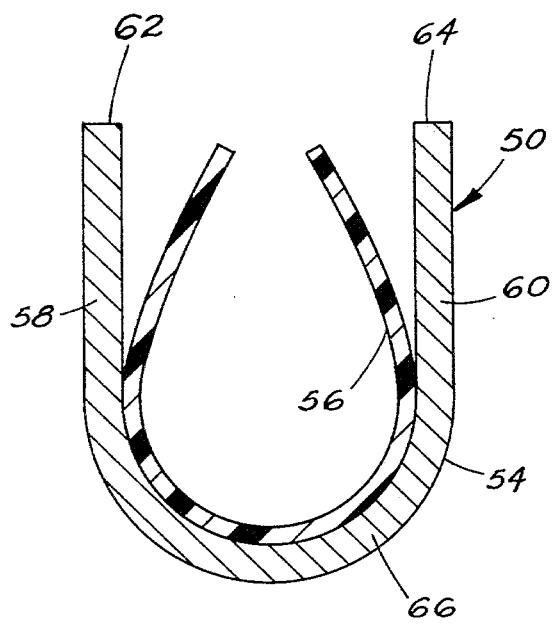
FIG. 9 is a sectional view of an alternative construction of a door edge guard at the stage mentioned above with respect to FIG. 5.
Figure 10:
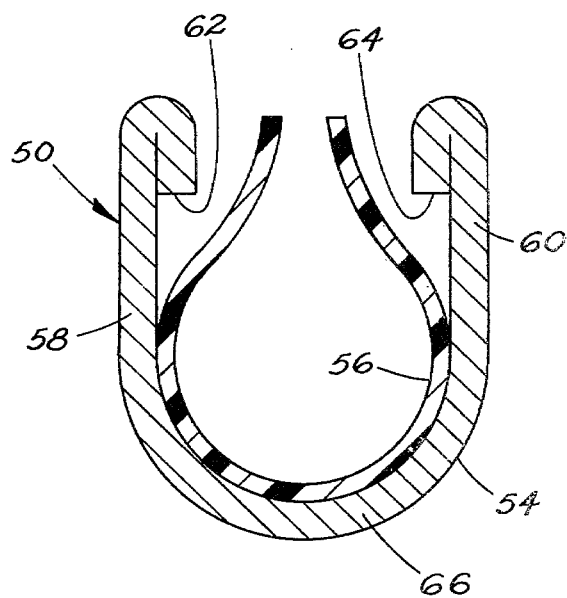
FIG. 10 is a sectional view of the door edge guard of FIG. 9 in a second stage in its manufacture.

FIGS. 9, 10 and 11 illustrate a door edge guard in three stages of its manufacture. The edge guard 50 has a U-shaped metal element 54, a plastic liner 56, a bottom portion 66 and legs 58 and 60 with ends 62 and 64. The plastic liner is bonded to the metal channel 60 only at the bottom and lower leg portions at the stage shown in FIG. 9. In FIG. 10, the legs 58 and 60 have had their respective ends 62 and 64 folded inwardly upon themselves, and, in FIG. 11, this step has been followed by bonding of the liner 56 to the inner sides of the ends 62 and 64. The liner ends 68 and 70 serve to electrically insulate the door edge guard from the door on which it is installed.

Based upon the foregoing description, what is claimed is:

1. A method for manufacturing a door edge guard of the type having a metal outer U-shaped channel element and a plastic U-shaped inner channel element within the outer channel, the method comprising the steps of:
    (a) bonding the plastic material to form the inner channel element to at least a portion of the surface area of the metal element; and
    (b) roll-forming the metal element into a U-shaped channel, the plastic material having the general shape of the inner surface of the U-shaped metal channel element, the bonding of at least a portion of the plastic material to the surface of the metal element occurring prior to completion of the roll-forming operation; including the step of applying plastic material to the inner and outer sides of the ends of the legs of the U-shaped metal channel element.

2. A method according to claim 1 wherein the plastic material is applied to the ends of the legs separately from the aforementioned plastic material bonded to the surface of the metal element.

3. A method according to claim 1 wherein the plastic material applied to the ends of the legs is a part of the plastic material bonded to the surface of the metal element.

4. A method for manufacturing a door edge guard of the type having a metal outer U-shaped channel element and a plastic U-shaped inner channel element within the outer channel, the method comprising the steps of:
    (a) bonding the plastic material to form the inner channel element to at least a portion of the surface area of the metal element; and
    (b) roll-forming the metal element into a U-shaped channel, the plastic material having the general shape of the inner surface of the U-shaped metal channel element, the bonding of at least a portion of the plastic material to the surface of the metal element occurring prior to completion of the roll-forming operation; including the steps of folding over upon themselves the ends of the legs of the U-shaped metal element and applying a plastic material to the surfaces of the respective leg ends which become innermost after the legs are folded over upon themselves.

5. A method according to claim 4 wherein the plastic material applied to the leg ends is applied before the ends are folded over upon themselves.

6. A method according to claim 4 wherein the plastic material applied to the ends of the legs of the metal element is applied separately from the aforementioned plastic material bonded to at least a portion of the surface of the U-shaped channel element.

7. A method according to claim 4 wherein the plastic material on the leg ends is applied after the leg ends are folded over upon themselves.

8. A method according to claim 4 where the step of bonding comprises the aforementioned plastic material bonded to at least a portion of the inner surface area of the metal element prior to completion of the roll-forming step and bonding the plastic material to the ends of the legs of the metal element after the ends have been folded over upon themselves.

9. A method of manufacturing, by means of roll-forming procedures, an insulated edge guard of generally U-shaped cross section having inner and outer legs via which the edge guard mounts on an edge, said edge guard being of the type comprising a metal U-shaped channel formed from a metal strip and an insulating liner on the interior of the metal U-shaped channel made from a non-metallic insulating material, said method comprising the steps of:
- (a) bonding the insulating material to the metal strip at a time prior to completion of the roll-forming procedures;
- (b) and including the step of forming the corresponding marginal edges of the metal strip and the insulating material which are to form the end of one of the legs of the edge guard such that a multiple thickness of at least one of said metal strip and said insulating material results at said one end of said one leg.

10. A method as set forth in claim 9 wherein the insulating material is a plastic film which is applied to a surface of the metal strip by bonding.

11. A method as set forth in claim 9 also including the step of forming the corresponding marginal edges of the metal strip and the insulating material which are to form the end of the other leg of the edge guard such that a multiple thickness of at least one of said metal strip and said insulating material results at the one end of said other leg.

* * * * *